(12) United States Patent
Miyashita (10) Patent No.: US 7,941,134 B2
(45) Date of Patent: May 10, 2011

(54) PUSH-TO-TALK COMMUNICATION SYSTEM AND PUSH-TO-TALK COMMUNICATION METHOD

(75) Inventor: Shigehiro Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 847 days.

(21) Appl. No.: 11/886,182

(22) PCT Filed: Mar. 24, 2006

(86) PCT No.: PCT/JP2006/305975
§ 371 (c)(1),
(2), (4) Date: Sep. 12, 2007

(87) PCT Pub. No.: WO2006/104040
PCT Pub. Date: Oct. 5, 2006

(65) Prior Publication Data
US 2008/0146224 A1   Jun. 19, 2008

(30) Foreign Application Priority Data
Mar. 25, 2005 (JP) .................. 2005-089345

(51) Int. Cl.
*H04M 3/00* (2006.01)
*H04L 5/16* (2006.01)
(52) U.S. Cl. ...................... 455/418; 370/296
(58) Field of Classification Search .............. 370/296, 370/389; 386/95; 382/103; 705/51; 455/450
See application file for complete search history.

(56) References Cited

U.S. PATENT DOCUMENTS

| 5,590,127 | A |   | 12/1996 | Bales et al. |
| 7,130,282 | B2 | * | 10/2006 | Black .................. 370/296 |
| 2004/0057449 | A1 |   | 3/2004 | Black |
| 2004/0141594 | A1 |   | 7/2004 | Brunson et al. |
| 2004/0215568 | A1 | * | 10/2004 | Fukushima et al. ........... 705/51 |
| 2005/0041646 | A1 |   | 2/2005 | Punj et al. |
| 2005/0066047 | A1 |   | 3/2005 | Miyake et al. |
| 2006/0204033 | A1 | * | 9/2006 | Yoshimine .............. 382/103 |
| 2007/0009231 | A1 | * | 1/2007 | Shinkai et al. ............ 386/95 |

FOREIGN PATENT DOCUMENTS

| JP | 9-36917 A | 2/1997 |
| JP | 2001-197540 A | 7/2001 |
| JP | 2001-218273 A | 8/2001 |
| JP | 2001-350473 A | 12/2001 |
| JP | 2002-44249 A | 2/2002 |
| JP | 2002-135854 A | 5/2002 |
| JP | 2003-87727 A | 3/2003 |
| JP | 2004-72310 A | 3/2004 |
| JP | 2004-229296 A | 8/2004 |
| JP | 2005-45773 A | 2/2005 |
| JP | 2006-500827 A | 1/2006 |
| JP | 2006-500828 A | 1/2006 |
| WO | 2004/028113 A1 | 4/2004 |

* cited by examiner

*Primary Examiner* — Charles N Appiah
*Assistant Examiner* — Kiet Doan
(74) *Attorney, Agent, or Firm* — Young & Thompson (57) ABSTRACT

The communication form of each terminal which participates in PTT communication is registered in a call control server in advance. When performing PTT communication, a call control server (100a) detects the communication form of each terminal. As a result, speech data is extracted from moving image data transmitted from a transmission terminal and is delivered to a speech PTT terminal which can receive only speech data (S11, S12). On the other hand, moving image data transmitted from a transmission terminal is delivered to a moving image PTT terminal compatible with moving image data without any change (S13). This makes it possible to implement PTT communication in accordance with the communication form of each terminal.

11 Claims, 8 Drawing Sheets

PUSH-TO-TALK COMMUNICATION SYSTEM AND PUSH-TO-TALK COMMUNICATION METHOD

TECHNICAL FIELD

The present invention relates to a push-to-talk communication system and a push-to-talk communication method and, more particularly, to a push-to-talk communication system and a push-to-talk communication method which can perform push-to-talk communication of speech data and moving image data.

BACKGROUND ART

Figure 1:
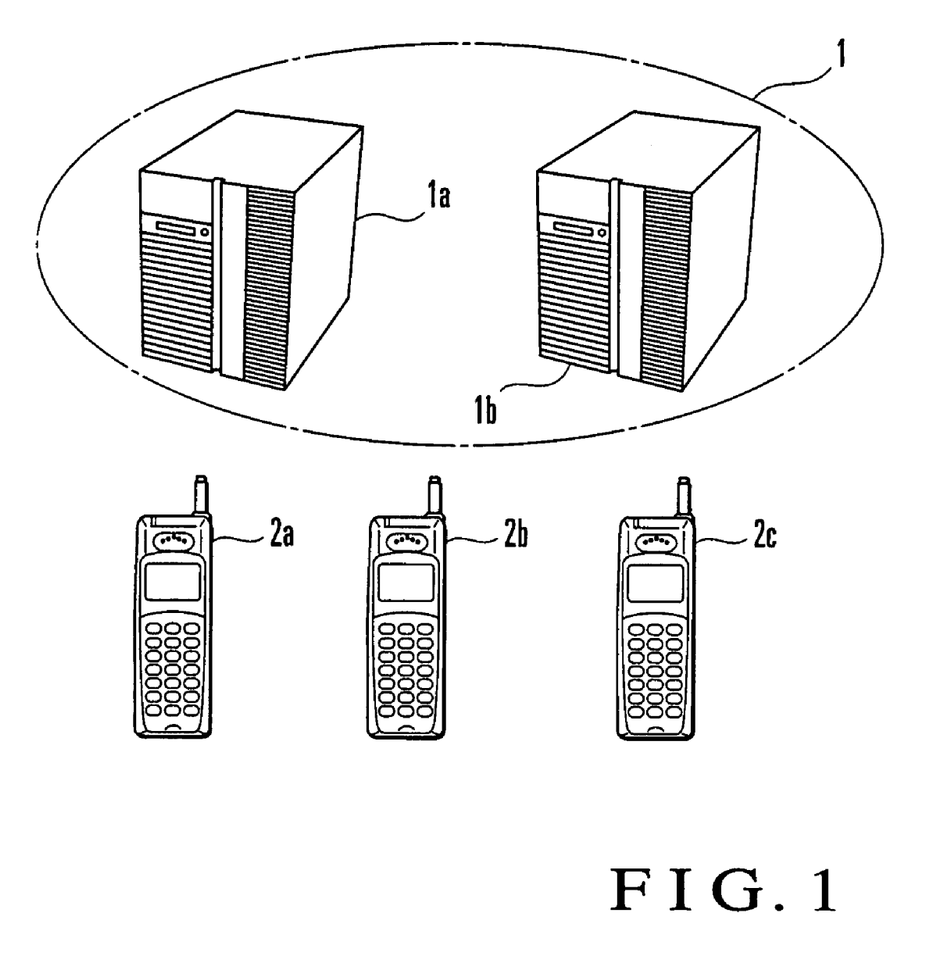
FIG. 1 is a block diagram showing the arrangement of a conventional PTT communication system.

The arrangement of a conventional push-to-talk (to be abbreviated to "PTT" hereinafter) communication system will be described with reference to FIG. 1. The conventional PTT communication system comprises a server apparatus (PTT communication infrastructure) 1 which controls communication between terminals, and speech PTT terminals 2a to 2c which transmit speech. The server apparatus 1 exists in the mobile communication network established by a mobile communication carrier. The mobile communication carrier provides an access network between the server apparatus 1 and the speech PTT terminals 2a to 2c held by users, and the server apparatus 1 can communicate general speech data with each speech PTT terminal.

The server apparatus 1 comprises two functional units, i.e., a call control server 1a and a real-time communication server 1b.

The call control server 1a manages a group (to be referred to as a PTT group hereinafter) comprising the speech PTT terminals 2a to 2c which perform PTT communication, call operation for the PTT group, talk right arbitration, and the like.

The real-time communication server 1b delivers speech data transmitted from one speech PTT terminal (e.g., the terminal 2a) to other speech PTT terminals (e.g., the terminals 2b and 2c) belonging to the PTT group under the control of the call control server 1a. This allows the users to communicate with other users belonging to the PTT group by using the speech PTT terminals 2a to 2c.

Reference 1 (Japanese Patent Laid-Open No. 2001-350473) has proposed a technique of converting digital image information comprising a plurality of pixel groups each having a predetermined size into speech information by sequentially applying a predetermined algorithm to each predetermined quantization information which each pixel of the image information has along a predetermined time axis direction and converting the quantization information of each pixel into specific speech information.

Reference 2 (Japanese Patent Laid-Open No. 2002-44249) has proposed a technique in which a communication data conversion server has a personal information database which stores information concerning the image, character, and speech formats of cellular phones and a format conversion system which converts the image, character, and speech formats, and cellular phones are allowed to transmit/receive information even if they have different image, character, and speech formats.

Reference 3 (Japanese Patent Laid-Open No. 2002-135854) has proposed a technique of shortening the effective access time of speech dispatch communication by removing speech from a selected data packet before a dispatch server delivers data to active mobile units in a dispatch group.

DISCLOSURE OF INVENTION

Problem to be Solved by the Invention

The conventional PTT communication system has the following problem.

In the conventional PTT communication system, the speech PTT terminals 2a to 2c and the call control server 1a are compatible with only speech communication, and hence cannot transmit/receive moving image data like video phones whose number of users has recently grown. Assume that the call control server 1a can transmit/receive moving image data. Even in this case, in an environment in which the speech PTT terminals 2a to 2c and moving image PTT terminals exist together, the speech PTT terminals 2a to 2c cannot perform transmission/reception using moving image data. Consequently, therefore, in the environment in which the speech PTT terminals 2a to 2c and the moving image PTT terminals exist in the same PTT group, it is impossible to perform communication using moving image data.

It is, therefore, an object of the present invention to implement PTT communication in accordance with the communication form (compatible with only speech or moving images) of each terminal.

Means of Solution to the Problem

In order to achieve this object, a PTT communication system according to the present invention is characterized by comprising a plurality of portable terminals, and a server which is connected to the portable terminals through a communication network and manages group communication between the portable terminals, the server comprising call control means for performing communication control between the portable terminals which perform group communication, and real-time communication means for receiving and delivering data between the portable terminals which participate in group communication in accordance with communication control by the call control means, and the real-time communication means comprising reception means for receiving data transmitted form the portable terminal, data conversion means for converting the received data into a predetermined data format, and delivery means for delivering the converted data to another portable terminal.

A PTT communication method according to the present invention is characterized by comprising the steps of causing a server which manages group communication between a plurality of portable terminals to perform communication control between the portable terminals, causing the server to receive data transmitted from a portable terminal, causing the server to convert received data into a predetermined data format, and causing the server to deliver converted data to another portable terminal.

Effects of the Invention

The present invention can implement PTT communication in accordance with the communication form of each terminal by converting the data format of transmission data on the server side.

BEST MODE FOR CARRYING OUT THE INVENTION

An embodiment of the present invention will be described below.

Figure 2:
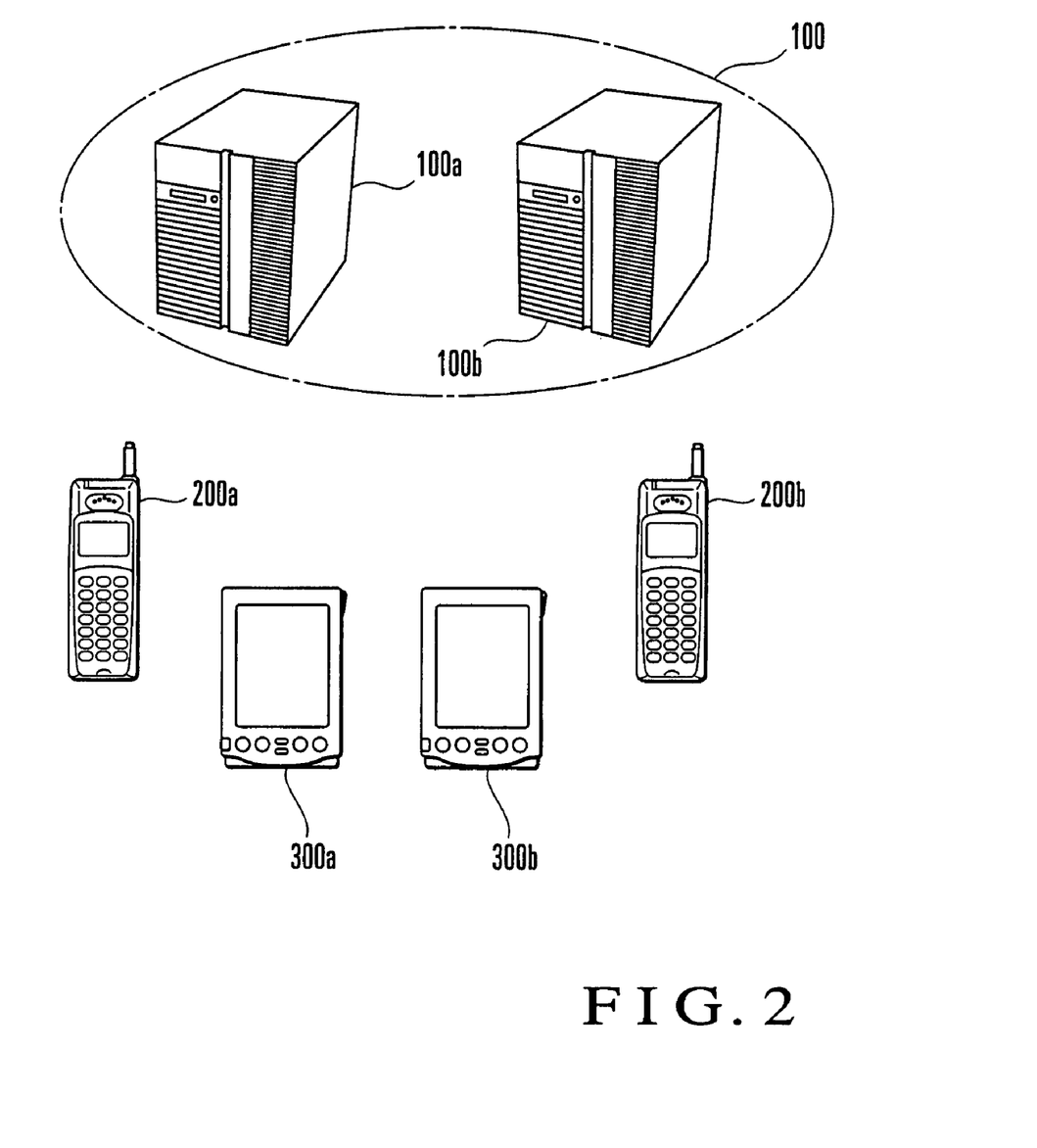
FIG. 2 is a block diagram showing the arrangement of a PTT communication system according to an embodiment of the present invention.

The arrangement of a PTT (push-to-talk) communication system according to an embodiment will be described with reference to FIG. 1. The PTT communication system according to this embodiment comprises speech PTT terminals 200a and 200b, moving image PTT terminals 300a and 300b, and a server apparatus 100 as a PTT communication infrastructure which manages group communication between the terminals 200a, 200b, 300a, and 300b.

The server apparatus 7100 exists in the mobile communication network established by a mobile communication carrier. The mobile communication carrier provides an access network (communication network) between the server apparatus 100 and the speech PTT terminals 200a and 200c and moving image PTT terminals 300a and 300b held by users, and the server apparatus 100 can communicate general speech/moving image data with the PTT terminals 200a, 200b, 300a, and 300b.

The server apparatus 100 comprises a call control server 100a and a real-time communication server 100b.

Figure 3:
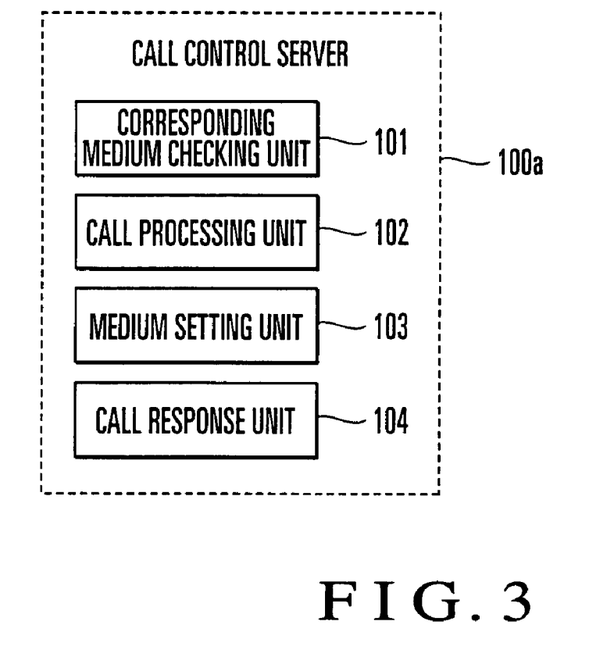
FIG. 3 is a block diagram showing the functional units of a call control server in FIG. 2.

The call control server 100a includes a communication control function for management of a group (to be referred to as a PTT group hereinafter) comprising the moving image PTT terminals 300a and 300b and speech PTT terminals 200a and 200b held by users, call control on the PTT group, talk right arbitration, and the like. The call control server 100a also designates delivery destinations of moving image/speech data by PTT communication with respect to the real-time communication server 100b. More specifically, the call control server 100a includes a corresponding medium checking unit 101, call processing unit 102, medium setting unit 103, and call response unit 104, as shown in FIG. 3.

Figure 4:
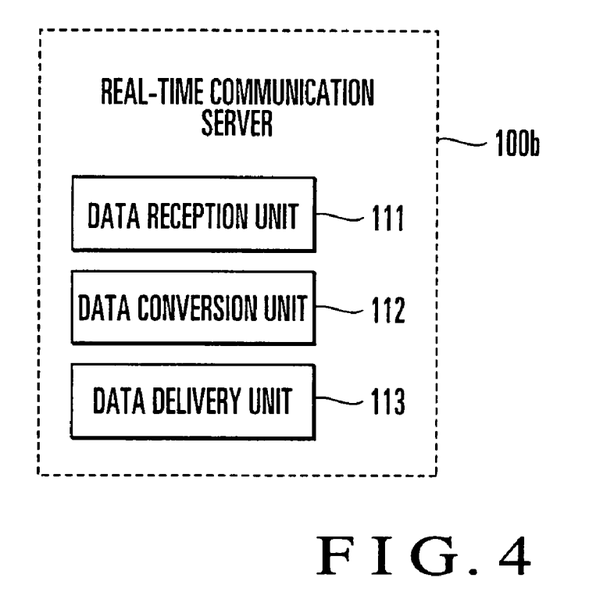
FIG. 4 is a block diagram showing the functional units of a real-time communication server in FIG. 2.
Figure 5:
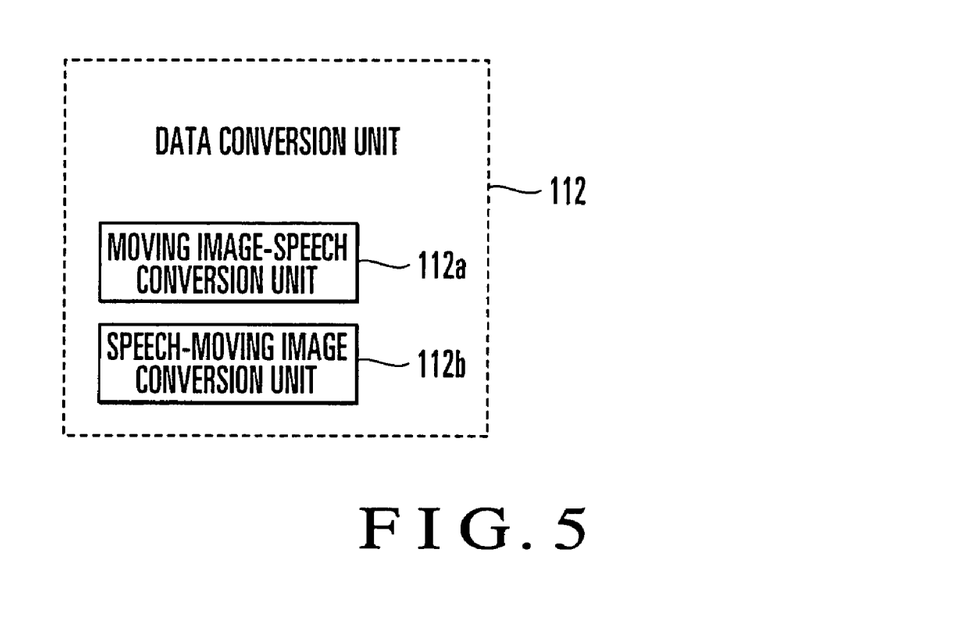
FIG. 5 is a block diagram showing the functional units of a data conversion unit in FIG. 4.

Upon receiving the designation from the call control server 100a, the real-time communication server 100b receives transmissions (moving image/speech data) from the moving image PTT terminals 300a and 300b and the speech PTT terminals 200a and 200b, and delivers the moving image/speech data to other terminals belonging to the PTT group upon performing necessary conversion processing. More specifically, as shown in FIG. 4, the real-time communication server 100b includes a data reception unit 111, data conversion unit 112, and data delivery unit 113. The data conversion unit 112 further comprises a moving image-speech conversion unit 112a and a speech-moving image conversion unit 112b, as shown in FIG. 5.

Figure 6:
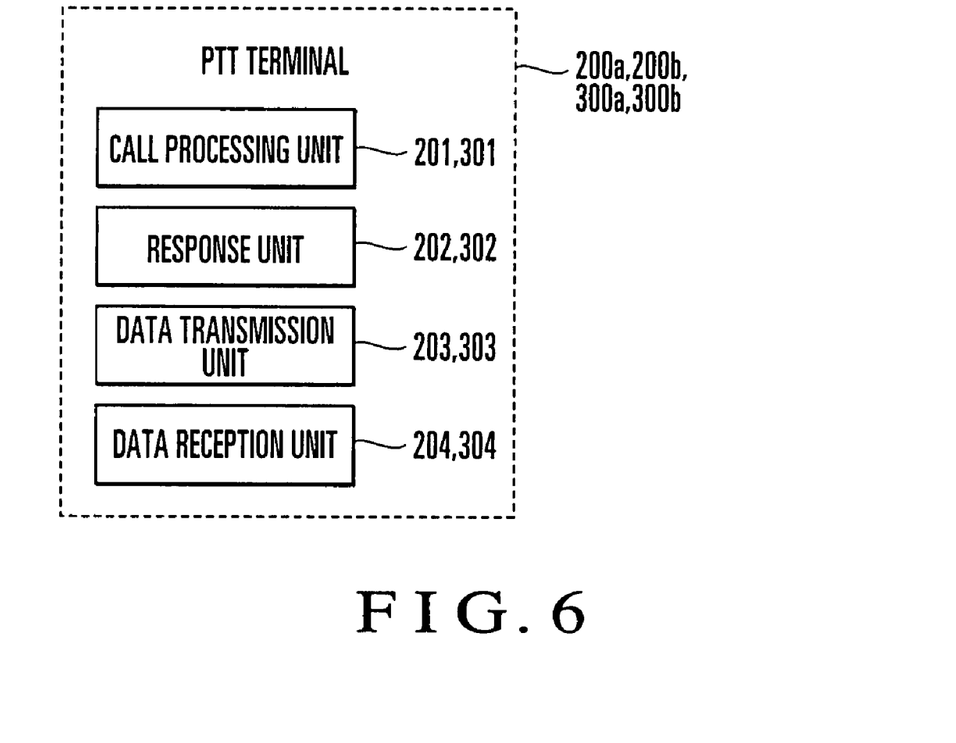
FIG. 6 is a block diagram showing the functional units of a PTT terminal in FIG. 2.

The users operate the speech PTT terminals 200a and 200b to perform group transmission by speech with terminals belonging to the PTT group which are registered in the speech PTT terminals 200a and 200b or in the call control server 100a. The users operate the moving image PTT terminals 300a and 300b to perform group transmission by speech or moving images with terminals belonging to the PTT group which are registered in the moving image PTT terminals 300a and 300b or in the call control server 100a. More specifically, as shown in FIG. 6, the speech PTT terminals 200a and 200b and the moving image PTT terminals 300a and 300b respectively include call processing units 201 and 301, response units 202 and 302, data transmission units 203 and 303, and data reception units 204 and 304. The speech PTT terminals 200a and 200b and the moving image PTT terminals 300a and 300b are portable terminals such as cellular phone terminals and PHS terminals.

Communication operation in the PTT communication system according to this embodiment will be described in detail next.

Figure 7:
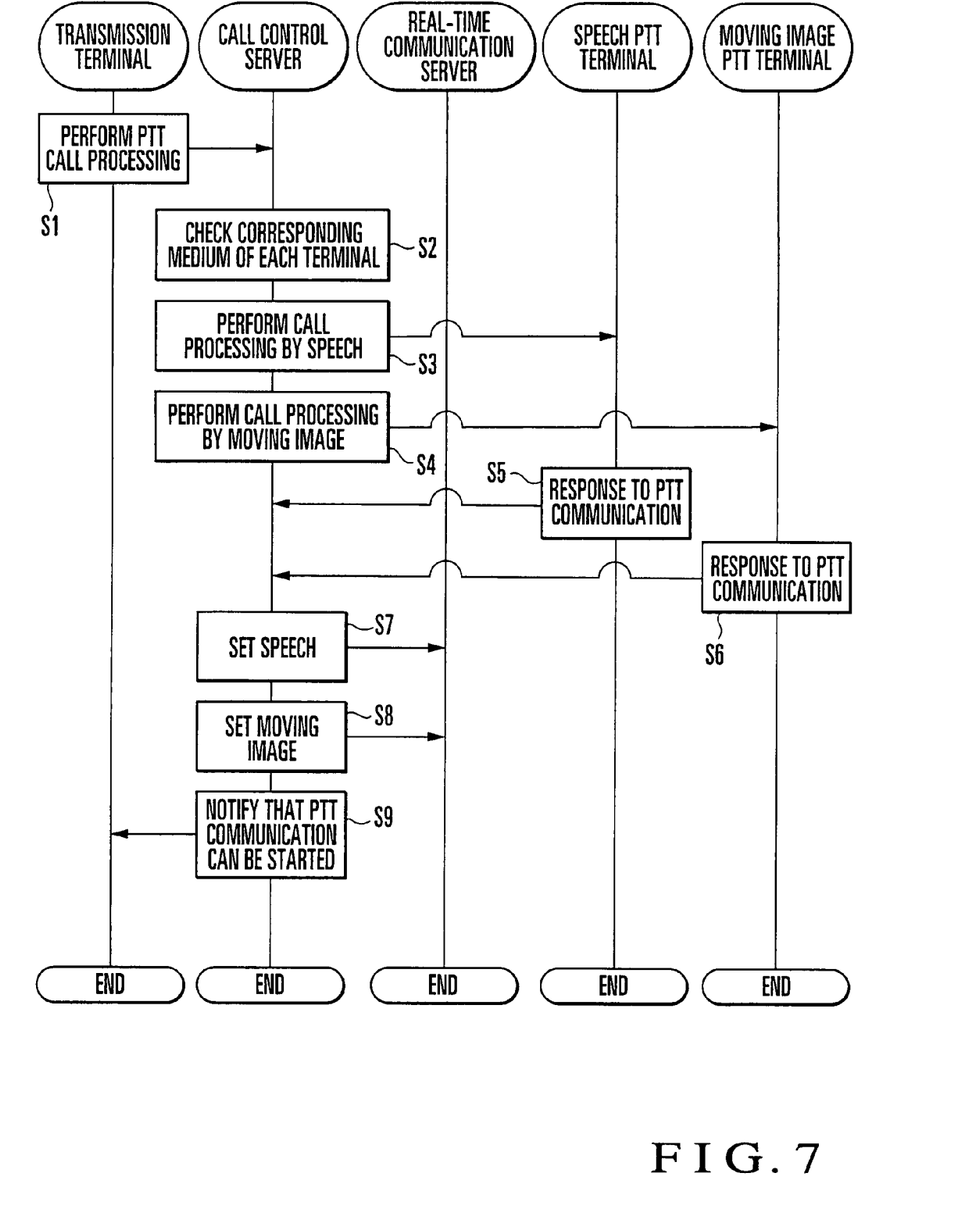
FIG. 7 is a flowchart showing setup processing in the PTT communication system according to this embodiment.

Setup processing for the execution of PTT communication will be described first with reference to FIG. 7. Assume that the moving image PTT terminal 300a is to issue a request to start PTT communication.

The call processing unit 301 of the moving image PTT terminal (to be referred to as a transmission terminal hereinafter) 300a performs PTT origination processing with respect to the call control server 100a (step S1).

The call control server 100a performs general processing such as a check on the talk right of the transmission terminal with respect to the PTT group, and the data format checking unit 101 checks corresponding media (data formats) of the terminals 200a, 200b, 300a, and 300b belonging to the target PTT group (step S2).

An example of a method of checking corresponding media by the data format checking unit 101 will be described. In the call control server 100a, the corresponding media of the terminals 200a, 200b, 300a, and 300b are registered in the database in advance. A corresponding medium is an item indicating whether each terminal corresponds to only speech or corresponds to moving images as well as speech. A signal transmitted from the transmission terminal 300a at the time of origination processing contains the identification information of the transmission terminal 300a. The data format checking unit 101 specifies a group to which the transmission terminal 300a belongs from this identification information, and reads out the corresponding media of the terminals 200a, 200b, 300a, and 300b belonging to this group from the above database. In this manner, the data format checking unit 101 checks corresponding media.

In the call control server 100a, the call processing unit 102 performs PTT call processing by speech with respect to the reception terminals (speech PTT terminals) 200a and 200b corresponding to only speech data and belonging to the PTT group (step S3). The call processing unit 102 further performs PTT call processing by speech and moving images with respect to the reception terminal (moving image PTT terminal) 300b corresponding to moving image data and belonging to the PTT group. In this case, this system presents the user with speech in addition to a moving image as a medium which can be used for calling operation, thereby prompting the user to select a medium to be used on the reception terminal 300*b* side which corresponds to moving images. The call processing unit 102 also functions as a data format check requesting unit which issues a request to check the data format of delivery data to each reception terminal.

Upon receiving PTT calls by speech from the call processing unit 102 of the call control server 100*a*, the response units 202 of the speech PTT terminals 200*a* and 200*b* return responses indicating participation/nonparticipation in PTT communication (step S5). Upon receiving a PTT call by speech and a moving image from the call processing unit 102, the response units 302 of the moving image PTT terminal 300 returns a response indicating participation/nonparticipation in PTT communication. At this time, the response unit 302 selects speech or a moving image as a medium (data format), and returns a delivery request by the selected medium to the call control server 100*a* (step S6). Therefore, the response unit 302 also functions as a data format response unit.

In the call control server 100*a* which has received the response, the medium setting unit 103 executes speech communication setting for the real-time communication server 100*b* to prepare for PTT communication by speech on the basis of the check result obtained by the corresponding medium checking unit 101 and the responses from the terminals 200*a*, 200*b*, and 300*b* (step S7). Likewise, the medium setting unit 103 executes moving image communication setting for the real-time communication server 100*b* to prepare for PTT communication by moving images on the basis of the above check result and responses (step S8). The call response unit 104 returns a PTT call response to the transmission terminal 300*a*, thereby notifying that preparation for the start of PTT communication has been made (step S9).

Figure 8:
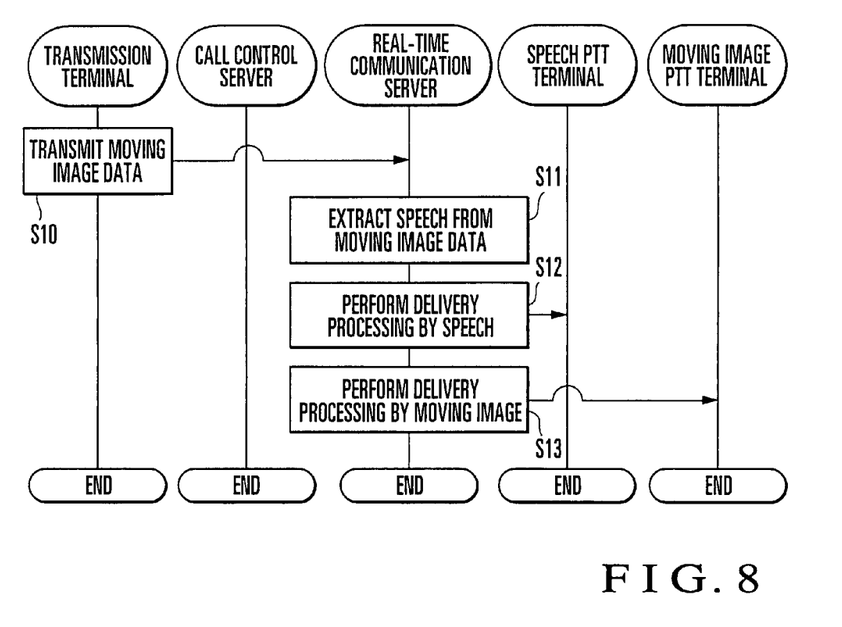
FIG. 8 is a flowchart showing delivery processing of moving image data in the PTT communication system according to this embodiment.

PTT communication processing by moving images will be described next with reference to FIG. 8.

Upon completion of setup processing through the processing in steps S1 to S9, the data transmission unit 303 of the transmission terminal 300*a* compatible with moving images transmits moving image data containing speech to the real-time communication server 100*b*, together with a talk right control signal (step S10).

The data reception unit 111 of the real-time communication server 100*b* receives a talk right control signal and moving image data from the transmission terminal 300*a*. The moving image-speech conversion unit 112*a* of the data conversion unit 112 extracts a speech portion from the received moving image data and generates speech data, thereby converting the moving image data into speech data (step S11). The data delivery unit 113 delivers the speech data extracted from the moving image data to the speech PTT terminals 200*a* and 200*b* participating in PTT communication (step S12). On the other hand, the data delivery unit 113 delivers the received image data to the moving image PTT terminal 300*b* participating in PTT communication (step S13). Note that when the moving image PTT terminal 300*b* issues a request to deliver by speech in step S6, the data delivery unit 113 delivers speech data to the moving image PTT terminal 300*b*.

The data reception units 204 of the speech PTT terminals 200*a* and 200*b* receive speech data from the real-time communication server 100*b*. The data reception unit 304 of the moving image PTT terminal 300*b* receives the moving image data from the real-time communication server 100*b*.

Figure 9:
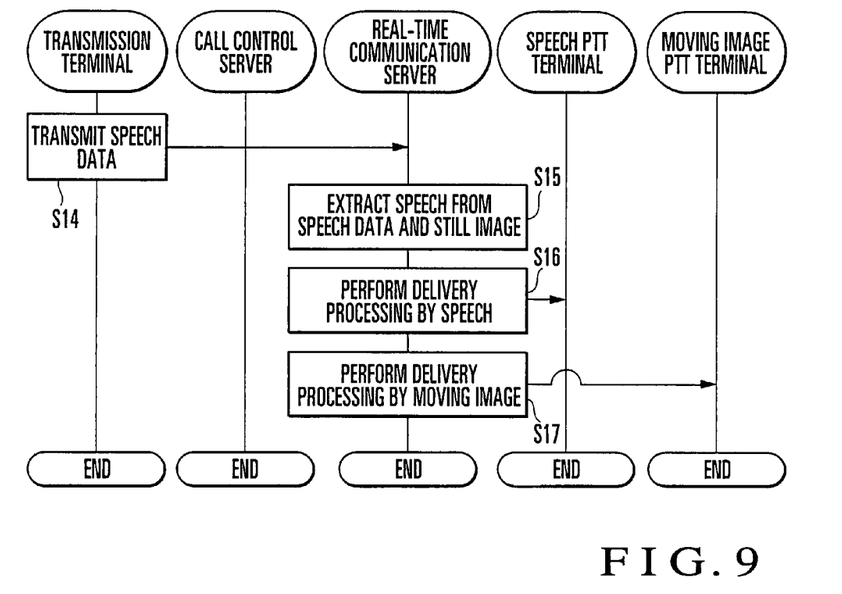
FIG. 9 is a flowchart showing delivery processing of speech data in the PTT communication system according to this embodiment.

PTT communication processing by speech will be described next with reference to FIG. 9.

When setup processing is complete through the processing in steps S1 to S9, the data transmission unit 303 of the transmission terminal 300*a* compatible with moving images transmits speech data to the real-time communication server 100*b*, together with a talk right control signal (step S14).

The data reception unit 111 of the real-time communication server 100*b* receives the talk right control signal and speech data from the transmission terminal 300*b*. The speech-moving image conversion unit 112*b* of the data conversion unit 112 converts the received speech data into moving image data corresponding to the transmission terminal 300*a* (step S15).

For example, a plurality of moving image data including moving image data indicating a state wherein a person is talking are prepared in the speech-moving image conversion unit 112*b*, and moving image data corresponding to each terminal is registered in the speech-moving image conversion unit 112*b*. More specifically, the identification information of each terminal is stored in the speech-moving image conversion unit 112*b* in correspondence with the identification information of moving image data. The speech-moving image conversion unit 112*b* reads out moving image data corresponding to the transmission terminal 300*a* on the basis of the identification information of the transmission terminal 300*a* which is added to the received speech data, and combines the received speech data with the readout moving image data to generate new moving image data from the speech data. Note that the speech-moving image conversion unit 112*b* may select arbitrary moving image data and generate new moving image data by combining the selected moving image data with the received speech data instead of registering moving image corresponding to each terminal in advance.

The data delivery unit 113 delivers the received speech data to the speech PTT terminals 200*a* and 200*b* participating in PTT communication (step S16). On the other hand, the data delivery unit 113 delivers the generated moving image data to the moving image PTT terminal 300*b* participating in PTT communication (step S17).

The data reception units 204 of the speech PTT terminals 200*a* and 200*b* receive speech data from the real-time communication server 100*b*. The data reception unit 304 of the moving image PTT terminal 300*b* receives moving image data from the real-time communication server 100*b*.

Although this embodiment has exemplified the case wherein the transmission terminal 300*a* is a terminal compatible with moving images, the same basically applies to a case wherein the transmission terminal 300*a* is a terminal compatible with speech. The latter case differs from the former case in that the real-time communication server 100*b* generates a moving image for a terminal compatible with moving images on the basis of speech and information concerning a transmission terminal.

The PTT communication system according to this embodiment registers the communication forms of the terminals 200*a*, 200*b*, 300*a*, and 300*b* participating in PTT communication in the call control server 100*a* in advance. When performing PTT communication, the call control server 100*a* detects the communication forms of the terminals 200*a*, 200*b*, 300*a*, and 300*b* participating in PTT communication. This system extracts speech data from moving image data and delivers the speech data to the speech PTT terminals 200*a* and 200*b* which can receive only speech data, and delivers moving image data obtained by combining moving image data or still image data with speech data to the transmission terminals 300*a* and 300*b* which are compatible with moving image data. This makes it possible to implement PTT communication in accordance with the communication forms of the terminals 200a, 200b, 300a, and 300b. In addition, this can implement PTT communication without needing to be conscious of media which can be handled within a PTT group.

In addition, since the server apparatus 100 performs conversion processing from speech to a moving image, even if a PTT service shifts from speech to moving images, the system can accommodate old types of speech-compatible terminals.

Furthermore, since the server apparatus 100 has a function of transmitting proper media to the terminals 200a, 200b, 300a, and 300b participating in a PTT group, even if speech/moving image codecs technically advance to allow to provide services with higher sound quality/higher image quality, the system can accommodate old types of terminals.

Note that this embodiment has exemplified the case wherein the corresponding media of the terminals 200a, 200b, 300a, and 300b which participate in PTT communication are registered in the database of the call control server 100a in advance, and the corresponding medium checking unit 101 checks the corresponding media of the terminals 200a, 200b, 300a, and 300b. However, this processing is not essential for the present invention, and the call control server 100a may directly check the corresponding media of all the terminals 200a, 200b, 300a, and 300b.

The call processing unit 102 of the call control server 100a performs PTT call processing with all media with which the real-time communication server 100b is compatible regardless of the corresponding media of the terminals 200a, 200b, 300a, and 300b. In this case, the call processing unit 102 performs both PTT call processing by speech and PTT call processing by moving images. In response to this processing, the response units 202 and 302 of the terminals 200a, 200b, 300a, and 300b each return a request for delivery by one of media concerning call processing, a medium of speech or a moving image in this case, to the call processing unit 102 of the call control server 100a, together with information indicating participation/nonparticipation in PTT communication. This allows the call control server 100a to check corresponding media.

This embodiment is a preferred embodiment of the present invention, and can be variously modified and practiced within the spirit and scope of the present invention. For example, it is possible to implement the functions of this system by causing computers of the call control server 100a, real-time communication server 100b, speech PTT terminals 200a and 200b, and transmission terminals 300a and 300b in this embodiment to read and execute programs for implementing the functions of the system. This will be briefly described below.

Figure 10:
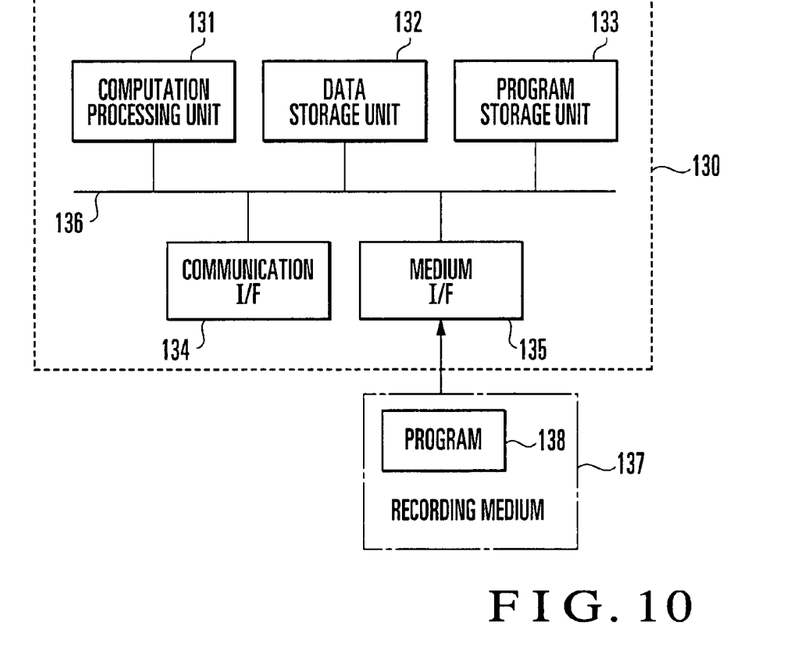
FIG. 10 is a block diagram showing an example of the arrangement of a call control server in FIG. 2.

Referring to FIG. 10, a computer 130 of the call control server 100a comprises a computation processing unit 131 comprising an MPU and the like, a data storage unit 132 and program storage unit 133 which comprise a hard disk and the like, a communication interface (I/F) 134 as an interface with a communication network, a medium interface (I/F) 135 as an interface with a computer-readable recording medium 137, and a bus 136 connecting the units 131 to 135. The recording medium 137 is, for example, a CD-ROM or a magnetooptical disk.

A program 138 for controlling the operation of the computer 130 is provided while being stored in the recording medium 137. When the recording medium 137 is connected to the medium I/F 135, the computation processing unit 131 reads out the program 138 from the recording medium 137 and transfers it to the program storage unit 133. At the start of operation, the computation processing unit 131 reads out the program 138 from the program storage unit 133 and operates in accordance with the program 138, thereby implementing the functions of the units 101 to 104 of the call control server 100a described above.

Figure 11:
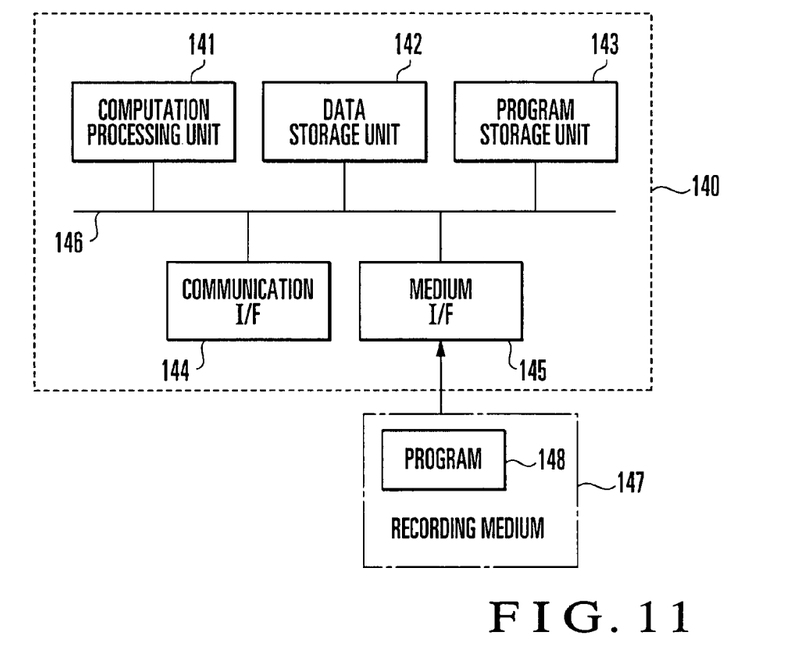
FIG. 11 is a block diagram showing an example of the arrangement of the real-time communication server in FIG. 2.

The same applies to the real-time communication server 100b, the speech PTT terminals 200a and 200b, and the moving image PTT terminals 300a and 300b. That is, as shown in FIG. 11, a computer 140 of the real-time communication server 100b comprises a computation processing unit 141 comprising an MPU and the like, a data storage unit 142 and program storage unit 143 which comprise a hard disk and the like, a communication interface (I/F) 144 as an interface with a network, a medium interface (I/F) 145 as an interface with a recording medium 147 storing a program 148, and a bus 146 which connects the units 141 to 145. The computation processing unit 141 operates in accordance with the program 148 to implement the functions of the units 111 to 113 of the real-time communication server 100b.

Figure 12:
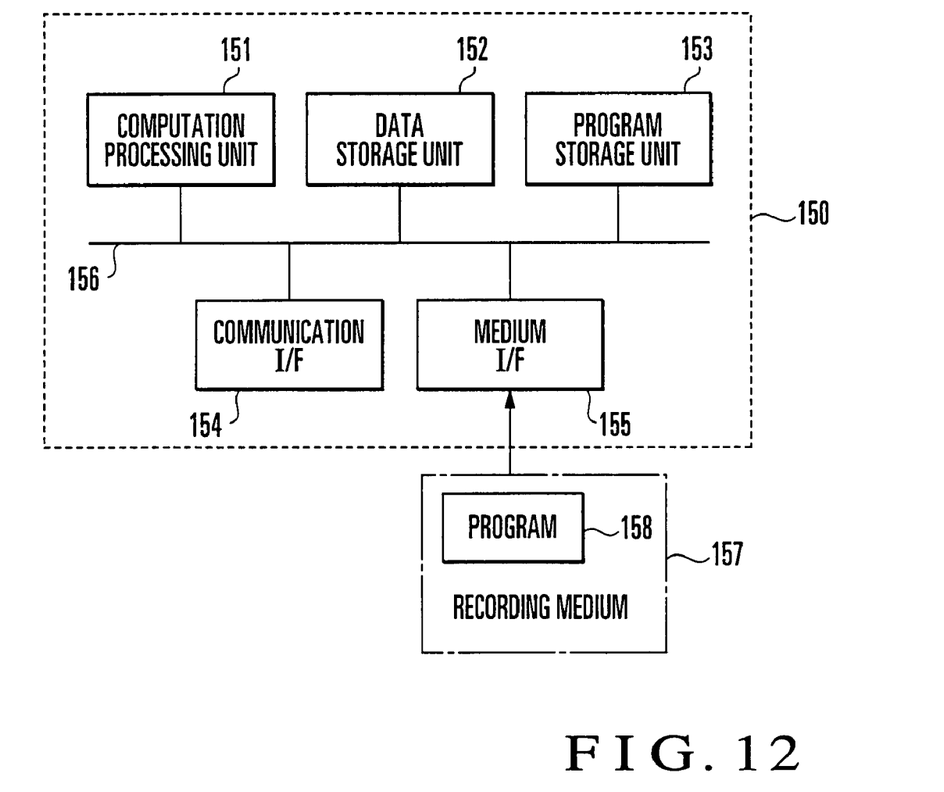
FIG. 12 is a block diagram showing an example of the arrangement of a terminal in FIG. 2.

As shown in FIG. 12, computers 150 of the speech PTT terminals 200a and 200b or transmission terminals 300a and 300b each comprise a computation processing unit 151 comprising a CPU and the like, a data storage unit 152 and program storage unit 153 which comprise a hard disk and the like, a communication interface (I/F) 154 as an interface with a network, a medium interface (I/F) 155 as an interface with a medium 157 storing a program 158, and a bus 156 which connects the units 151 to 155. The computation processing unit 151 operates in accordance with the program 158 to implement the functions of the units 201 to 204 and 301 to 304 of the terminals 200a, 200b, 300a, and 300b described above.

Note that it suffices to transmit the programs 138, 148, and 158 to other computer systems by carrier waves through the Internet, a telephone line, or the like as a transmission medium.

The above embodiment has exemplified the system arrangement in which the call control server 100a and the real-time communication server 100b exist as discrete components and are connected to each other. Obviously, however, the present invention can be applied to even an arrangement in which the functions of the two servers are implemented by one computer system or an arrangement in which a plurality of server apparatuses are added for the respective functions.

The invention claimed is:
1. A push-to-talk communication system, comprising:
a plurality of portable terminals; and
a server connected to said portable terminals through a communication network, said server configured to manage group communication between said portable terminals, said server comprising i) call control means for performing communication control between said portable terminals which perform group communication, and ii) real-time communication means for receiving and delivering data between said portable terminals which participate in group communication in accordance with communication control by said call control means,
said call control means comprising data format check requesting means for issuing a request to check a data format of data to be delivered with respect to each of said portable terminals, and
said real-time communication means comprising i) reception means for receiving data transmitted form said portable terminal, ii) data conversion means for converting the received data into a predetermined data format in accordance with a response from said portable terminal to the request by said call control means, and iii) delivery means for delivering the converted data to another portable terminal, wherein said data format check requesting means is configured to show each of said portable terminals compatible with moving image data a set of available data formats including moving image data formats and sound data formats to allow the portable terminal to prompt a user thereof to select a data format, and wherein said portable terminal comprises response means for selecting an arbitrary data format on the basis of a request from said data format check requesting means of said server, and returning a request for delivery in the selected data format to said server.

2. The push-to-talk communication system according to claim 1, wherein said data conversion means converts received data into one of speech data and moving image data.

3. The push-to-talk communication system according to claim 2, wherein said data conversion means comprises moving image-speech conversion means for, when received data is moving image data containing speech, converting the moving image data into speech data by extracting speech from the moving image data and generating speech data, and said delivery means delivers one of the converted speech data and the received image data for said each portable terminal.

4. The push-to-talk communication system according to claim 2, wherein said data conversion means comprises speech-moving image conversion means for, when received data is speech data, converting the speech data into moving image data by combining the speech data with moving image data registered in advance and generating new moving image data, and said delivery means delivers one of the converted moving image data and the received speech for said each portable terminal.

5. A push-to-talk communication method, comprising the steps of:

causing a server which manages group communication between a plurality of portable terminals to perform communication control between the portable terminals;

causing the server to issue a request to each of the portable terminals to check a data format of data to be delivered with respect to each of the portable terminals when the portable terminal issues a request to start group communication, the server providing each of the portable terminals supporting moving image data a set of available data formats including moving image data formats and sound data formats to enable the portable terminal to prompt a user thereof to select a data format;

causing the server to receive data transmitted from a portable terminal;

causing the server to convert received data into a predetermined data format in accordance with a response from the portable terminal to a request;

causing the server to deliver converted data to another portable terminal;

causing the portable terminal to select an arbitrary data format on the basis of a request from the server, and causing the portable terminal to return a request for delivery in the selected data format to the server.

6. The push-to-talk communication method according to claim 5, wherein in the step of causing the server to convert, received data is converted into one of speech data and moving image data.

7. The push-to-talk communication method according to claim 6, wherein the step of causing the server to convert comprises the step of, when the received data is moving image data containing speech, converting the moving image data into speech data by extracting speech from the moving image data and generating the speech data, and in the step of causing the server to deliver, one of converted speech data and received image data is delivered for each of the portable terminals.

8. The push-to-talk communication method according to claim 6, wherein the step of causing the server to convert comprises the step of, when received data is speech data, converting the speech data into moving image data by combining the speech data with moving image data registered in advance and generating new moving image data, and in the step of causing the server to deliver, one of converted moving image data and received speech data is delivered for each of the portable terminals.

9. A non-transitory computer-readable recording medium having stored thereon a program configured to cause a computer, constituting a server configured to manage group communication between a plurality of portable terminals, to execute the following:

a process of performing communication control between the portable terminals;

a process of issuing a request to check a data format of data to be delivered with respect to each of the portable terminals when the portable terminal issues a request to start group communication;

a process of sending each of said portable terminals compatible with moving image data a set of available data formats including moving image data formats and sound data formats to allow the portable terminal to prompt a user thereof to select a data format;

a process of receiving data transmitted from the portable terminal;

a process of converting the received data into a predetermined data format in accordance with a response from the portable terminal to a request; and a process of delivering the converted data to another portable terminal, wherein in the converting process, received data is converted into one of speech data and moving image data, wherein the converting process comprises a process of, when the received data is moving image data containing speech, converting the moving image data into speech data by extracting speech from the moving image data and generating the speech data, and wherein in the delivering process, one of converted speech data and received image data is delivered for each of the portable terminals.

10. The recording medium according to claim 9, wherein the converting process comprises a process of, when received data is speech data, converting the speech data into moving image data by combining the speech data with moving image data registered in advance and generating new moving image data, and in the delivering process, one of converted moving image data and received speech data is delivered for each of the portable terminals.

11. The recording medium according to claim 9, wherein the portable terminal is a cellular phone terminal.

* * * * *